United States Patent [19]

Schultz

[11] Patent Number: 5,701,070
[45] Date of Patent: Dec. 23, 1997

[54] ELECTRICAL GENERATOR DAMAGE PROTECTION APPARATUS AND METHOD WITH CIRCUIT BREAKER TRIP INITIATION

[75] Inventor: Mark H. Schultz, Shoreview, Minn.

[73] Assignee: Onan Corporation, Minneapolis, Minn.

[21] Appl. No.: 511,265

[22] Filed: Aug. 4, 1995

[51] Int. Cl.$^6$ ............................................. H02H 7/06
[52] U.S. Cl. ........................... 322/37; 322/27; 322/36
[58] Field of Search ................................ 322/20, 24, 25, 322/27, 37, 58; 307/84, 87

[56] References Cited

U.S. PATENT DOCUMENTS

| | | |
|---|---|---|
| 4,208,693 | 6/1980 | Dickens et al. . |
| 4,245,182 | 1/1981 | Aotsu et al. ........................... 322/20 |
| 4,443,828 | 4/1984 | Legrand et al. . |
| 4,589,052 | 5/1986 | Dougherty . |
| 4,855,664 | 8/1989 | Lane ....................................... 322/19 |
| 4,912,382 | 3/1990 | Koenig et al. . |
| 4,996,646 | 2/1991 | Farrington . |
| 5,006,781 | 4/1991 | Schultz et al. . |
| 5,117,174 | 5/1992 | Kessler ................................... 322/21 |
| 5,168,208 | 12/1992 | Schultz et al. . |
| 5,390,068 | 2/1995 | Schultz et al. . |

OTHER PUBLICATIONS

Standard Handbook for Electrical Engineers, Fink & Beaty, 11 edition, McGraw Hill (pp. 18–27 to 18–39) 1978.
ANSI/IEEE Standard 242–1986 (pp. 441–471) 1986.

*Primary Examiner*—Steven L. Stephan
*Assistant Examiner*—Nicholas Ponomarenko
*Attorney, Agent, or Firm*—Merchant, Gould, Smith, Edell, Welter & Schmidt, P.A.

[57] ABSTRACT

An electrical generator damage protection apparatus is provided. The protection apparatus includes a circuit breaker which opens and closes an electrical circuit in response to a breaker control signal. A controller is operatively coupled to the circuit breaker to generate the breaker control signal based upon periodically sensed current magnitudes output by a generator. This breaker control signal controls total current output by the generator over a predetermined time span to less than a generator damage curve. The generator damage curve corresponds to a maximum amount of total current which can be generated by the generator over the predetermined time span without damaging the generator. In addition, a electrical generator system having the protection apparatus is provided. Also, a method for protecting an electrical generator from damage with a breaker control signal which controls total current output by the generator over a predetermined time span to less than a generator damage curve is provided.

35 Claims, 4 Drawing Sheets

ELECTRICAL GENERATOR DAMAGE PROTECTION APPARATUS AND METHOD WITH CIRCUIT BREAKER TRIP INITIATION

FIELD OF THE INVENTION

The present invention relates to a control process system and more particularly to a method and apparatus for protecting an electrical generator from damage through microprocessor-controlled circuit breaker trip initiation.

BACKGROUND OF THE INVENTION

Electrical generator sets and power system controllers are generally capable of sharing real and reactive power with parallel generator sets and further providing for precise frequency, voltage and current regulation while utilizing a single processor. By so doing, system performance, reliability, and cost are optimized.

The output voltage of an electrical generator is determined by the excitation of the field windings of the generator. Therefore, the output voltage of the generator may be controlled in a closed-loop fashion by monitoring its output voltage, comparing that voltage to a reference voltage level, and generating an appropriate signal to the field winding. The speed of the engine driving the generator controls the generator output waveform frequency. Therefore, the frequency of the output waveform may be controlled in a closed-loop fashion by monitoring the revolutions of the engine, comparing the revolutions to a reference and generating an appropriate signal to adjust the engine throttle.

A need still exists for a mechanism which protects these generator sets from damages due to overloading or a short circuit. Some simple damage protection mechanisms have been used in the past; however these mechanisms typically would trip or open the circuit to the load either too soon or not soon enough. This has resulted in the capacity of many generators not being used completely or worse yet damage to generators when the mechanisms do not work quick enough to stop excessive current from being drawn by the load from the generators before the generators over heat and fail. Thus, a more accurate and reliable protection circuit which more closely follows the damage curve of a generator is needed The present invention provides a solution to this and other problems, and offers other advantages over the prior art.

SUMMARY OF THE INVENTION

An electrical generator damage protection apparatus is provided. The protection apparatus includes a circuit breaker which opens and closes an electrical circuit in response to a breaker control signal. A controller is operatively coupled to the circuit breaker to generate the breaker control signal based upon periodically sensed current magnitudes output by a generator. This breaker control signal controls total current output by the generator over a predetermined time span to less than a generator damage curve. The generator damage curve corresponds to a maximum amount of total current which can be generated by the generator over the predetermined time span without damaging the generator. In addition, an electrical generator system having the protection apparatus is provided. Also, a method for protecting an electrical generator from damage with a breaker control signal which controls total current output by the generator over a predetermined time span to less than a generator damage curve is provided.

These and various other features as well as advantages which characterize the present invention will be apparent upon reading of the following detailed description and review of the associated drawings.

DETAILED DESCRIPTION OF THE PREFERRED EMBODIMENT

Figure 1:
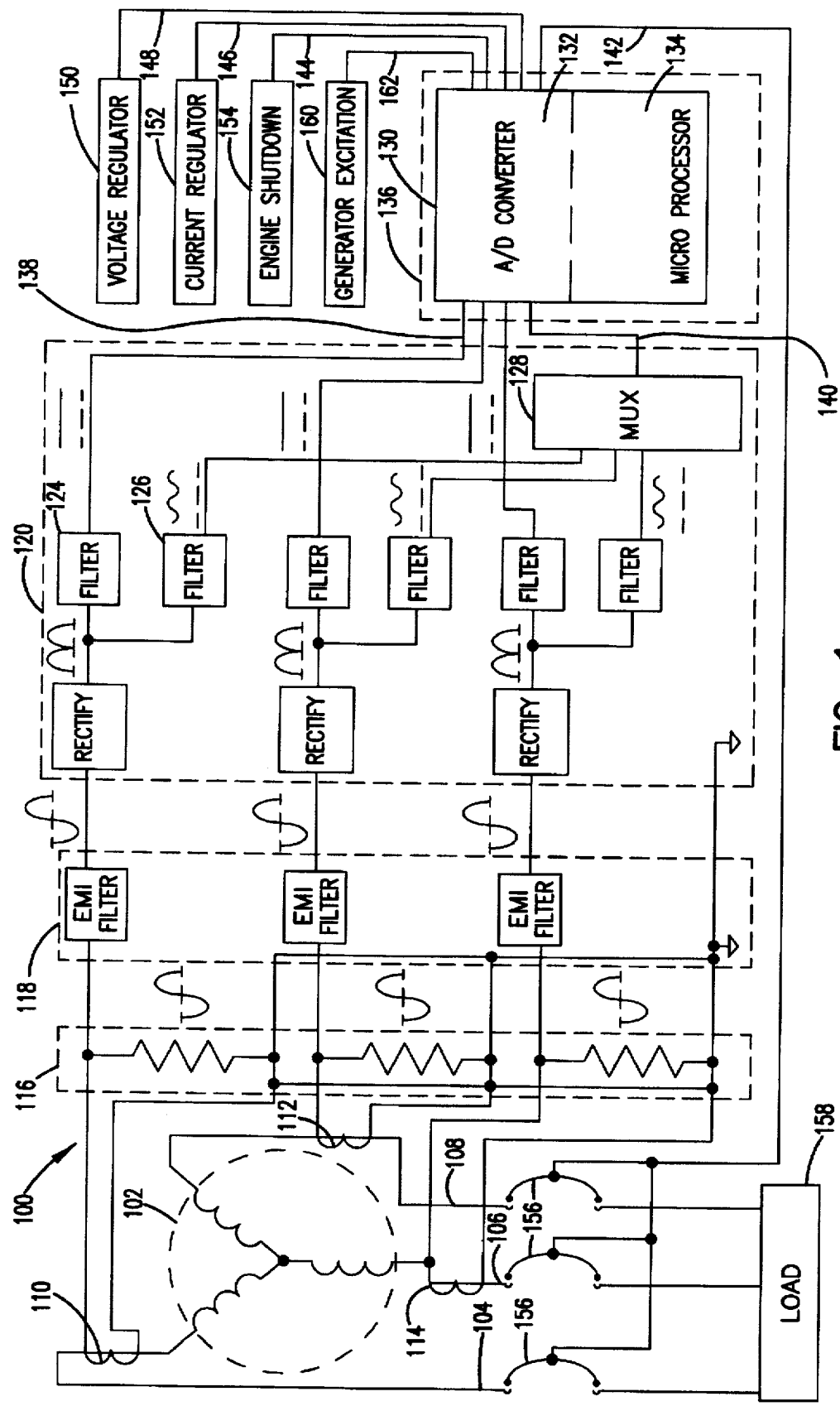
FIG. 1 is a block diagram showing a preferred embodiment electrical generation system in accordance with the present invention.

The preferred embodiment of the invention, as shown in FIG. 1, relates to a highly integrated control system for the monitoring and control of an electrical generator set 100 which hereafter will be referred to as a gen-set for convenience. More specifically, the preferred embodiment provides the capability for implementing one or more of the following control functions: circuit breaker/interrupter control, electronic governor control, automatic voltage regulation, regulated short circuit current, engine speed sensing, engine fault monitor, overload fault, short circuit fault, automatic synchronization, permissive paralleling, over and under voltage faults, remote metering and control, starting aid control, output power calculation and display, reverse power fault, permissive paralleling control, real power load sharing control during parallel operation, reactive power load sharing control during parallel operation, built-in self-diagnostics, and provision for external diagnostics equipment.

The control system includes a microprocessor control unit 130 comprising a micro/central processing unit (CPU) 134, a multi-channel analog to digital converter 132, and several other components on a digital board 136 such as high speed input-output devices, , an erasable programmable read only memory (EPROM), a pulse width modulator (PWM), an interrupt control, input/output (I/O) expander chips and a serial port. By way of example, parameters monitored by the control unit 130 include engine speed, generator voltage and current, load bus voltage, engine oil pressure, water temperature, fuel and speed, additional parallel gen-sets, and operator input. By monitoring these signals, comparing the signals to reference levels, and determining the appropriate output according to control equations, the micro-processor controls the operation and output of the engine generator system.

The two main control functions of the integrated controller are the regulation of the engine's revolutions per unit time, which affects the frequency of the generator output waveform, and the regulation of the excitation of the field windings of the generator, which affects the output voltage of the generator. To control these two functions, the microprocessor utilizes two different proportional, integral, derivative control equations which will be referred to herein as PID equations for convenience. The general form of a PID equation in the time domain is as follows:

$$u(t) = K_p E(t) + K_i \int E(t)dt + K_D \frac{dE(t)}{dt}$$

where $K_p$, $K_i$ and $K_D$ are the respective constants for the proportional, integral and derivative terms, respectively. The constants for the preferred embodiment of the present system control were derived from the analog compensation networks previously utilized with the gen-set. However, the constants may be derived by determination of the transfer function from the steady-state response or other such methods as are well known in the art. A more thorough discussion of the application of these control functions to gen-sets is found in U.S. Pat. No. 5,006,781 by Schultz et al. Entitled "Microprocessor Based Integrated Generator Set Controller Apparatus And Method".

Briefly, in operation, a preferred embodiment of the integrated control unit 130 constructed according to the principles of the present invention, periodically samples one of several analog channels (e.g., input channels 138 and 140). For example, the preferred embodiment samples the analog channels every 61.5 milliseconds (ms). These channels include sensed current magnitudes of the three phase currents produced by the generator 102 in the three phases 104, 106, and 108, respectively. The sensed current magnitudes are determined from current sensors 110, 112, and 114 which convert the magnitude of the current to sensed signals having a voltage value proportional to the current. Each of sensed signals are conditioned into a sine-wave form by resistor circuit 116. Subsequently, each of the sensed signals are passed through low pass filters 118 to further remove spurious noise from the signals. Final, signal conditioning is done by components on an analog board 120. This final signal conditioning includes, for example in each power phase, a rectifier 122 and filters 124 and 126 which produce a direct current (DC) voltage signal and a small alternating current (AC) signal, respectively, related to the sensed current. Each of the DC voltage signals (e.g., signal 138) is input to the analog-to-digital (A/D) converter 132. The small AC signals are combined together by multiplexer 128 prior to being input as a composite AC signal 140 to the A/D converter 132. The microprocessor utilizes the samples by applying the control process equations, and transmitting an appropriate regulated voltage response signal 162 through a pulse width modulator 160, resident in the microprocessor unit 130, to excite the field windings of the generator 102.

Besides integrating the basic gen-set control functions, another feature provided is a microprocessor controlled circuit breaker trip curve for both overload and short circuit conditions. These conditions are based on the characteristics of the generator 102 and in part on government specifications. This feature is provided by controlling the circuit breaker/interrupter 156. The interrupter 156 is opened at a given time associated with the amount of current being drawn by the load 158. When the interrupter 156 is opened, the gen-set is isolated from the load 158 thereby removing the over-load or short circuit condition.

Referring now to FIG. 1, a preferred embodiment electrical generator system 100 includes a generator 102 which generates polyphase electrical power. One or more circuit breakers 156 are operatively coupled to the generator 102. Each circuit breaker 156 opens and closes an electrical circuit for each electrical power phase 104, 106, 108, respectively, in response to a breaker control signal 142. The electrical circuit preferably has a conductor for each phase which transmits the electrical power to an external load 158. Current sensors 110, 112, and 114 are operatively coupled to the generator 102 phase outputs 104, 106, and 108, respectively to periodically sense a current magnitude of each phase of the generated electrical power during each sensing instance (i.e., at each sample time). In the preferred embodiment the sample time was chosen to be every 61.5 ms. However, it will be appreciated by those skilled in the art that faster or slower sampling rates could be used to change frequency of the generator damage protection checking sequence without departing from the scope and spirit of the present invention.

Figure 4:
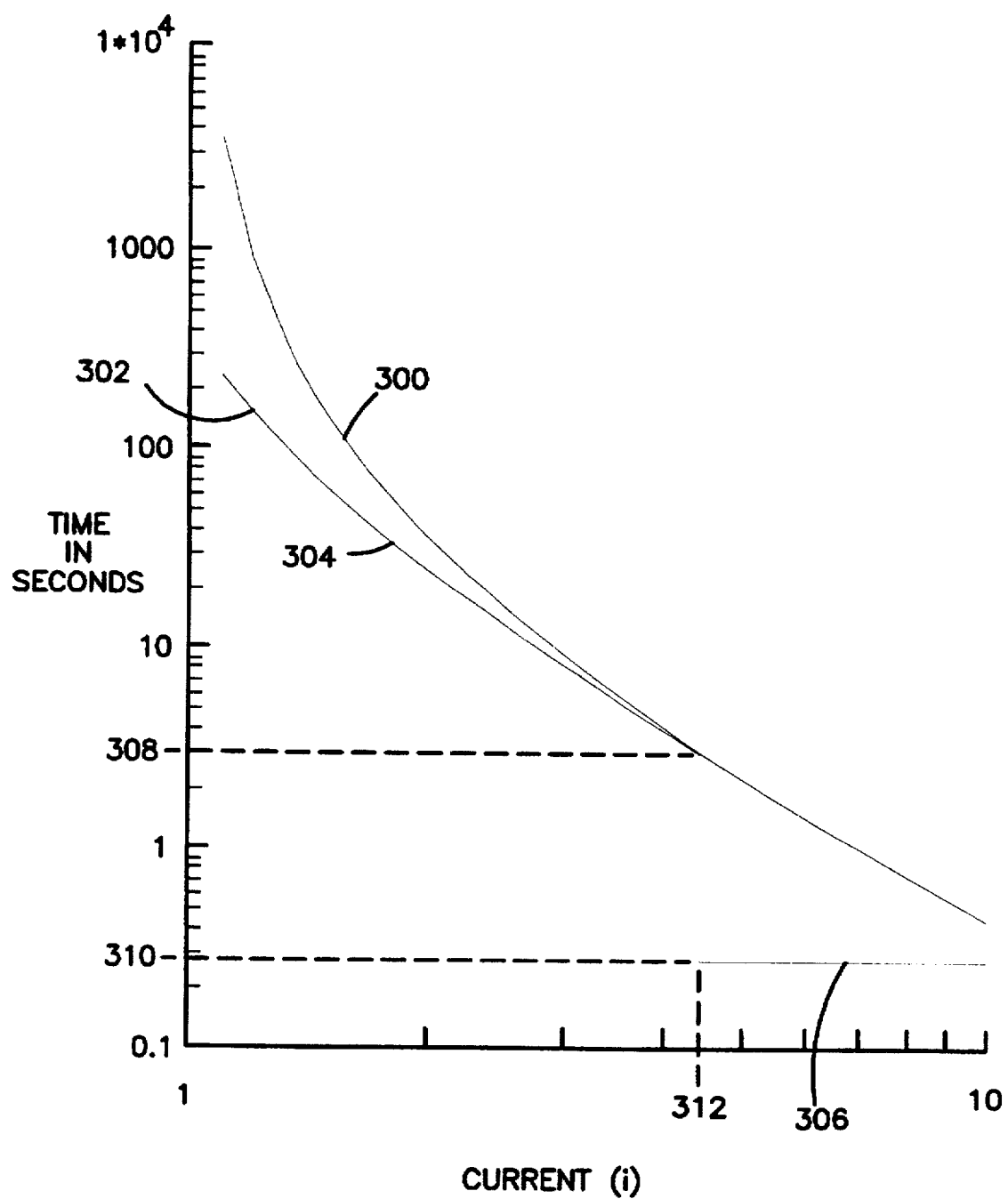
FIG. 4 is a chart showing an example circuit breaker trip curve and a generator damage curve for the system shown in FIG. 1 in accordance with the present invention.

A controller 130 is operatively coupled through various intermediary components to the circuit breakers 156 and the current sensors 110, 112, and 114 as described above. The controller 130 generates the breaker control signal 142 based upon the sensed current magnitudes (this breaker control signal 142 is sometimes referred to as a trip control signal or open breaker control signal depending on the type of circuit breaker 156 which is being used in the system 100). This is accomplished in such a manner that the breaker control signal 142 controls total current generated by the generator 102, as shown in FIG. 4 as trip current plot 302 over a predetermined time span to less than a generator damage curve 300. The generator damage curve 300 is a calculated maximum amount of total current which can be generated by the generator 102 over the predetermined time span without damaging the generator 102. In the preferred embodiment it is based on the Newage-Stamford "Thermal Damage Curve". A generator can be severely damaged (e.g., parts of it melt, combust, or otherwise malfunction) by excessive heat produced in generating current over the designed maximum current generation levels for extended periods of time.

An engine (not shown) may be mechanically linked to the generator 102 to provide rotational energy to the generator 102. In such an instance, the controller 130 may be configured to generate an engine shutdown signal 144 based upon the periodically sensed current magnitudes output by the generator 102. The engine shutdown signal 144 actuates an engine shutdown circuit 154 which stops the engine from providing rotational energy to the generator 102 prior to damage occurring in the generator 102 as a result of generating more than the maximum amount of total current over the predetermined time span.

In addition, an electric power regulator 150 can be operatively coupled to the generator 102 for regulating the generated electrical power. The controller 130 preferably generates an electric power regulation stop signal 146, 148 based upon the periodically sensed current magnitudes output by the generator 102 such that the electric power regulation stop signal 146,148 deactivates a voltage 150 and/or current regulator such that regulation of the generated electrical power stops when the engine shutdown signal 144 stops the engine.

Also, an excitation winding 160 can be operatively coupled to the generator 102 for generating electrical current. The controller 130 preferably generates a generator excitation stop signal 162 based upon the periodically sensed current magnitudes output by the generator 102 such that the generator excitation stop signal 162 de-energizes the excitation windings 160 such that the generator 102 stops generating current prior to damage occurring in the generator 102 as a result of generating more than the maximum amount of total current over the predetermined time span.

The controller 130 generates the breaker control signal 142 which makes the maximum generated output current of the generator follow the trip curve 302 (shown in FIG. 4) by iteratively performing the following damage protection steps 200 through 230 shown in FIGS. 2 and 3 and described below. By setting the constants and scaling factors appropriately, the trip curve 302 can be made to closely follow the generator damage curve 300 without exceeding the damage curve 300.

The controller 130 implements damage protection steps including determining 202 if a largest sensed phase current magnitude of a sensing instance is greater than 1.1 times a nominal current magnitude (i.e., the maximum instantaneously measured value of current that the damage protection algorithm will allow without instigating protection procedures such as opening a circuit breaker or shutting off an engine). When the largest sensed phase current is greater than 1.1 times the nominal value, then the protection algorithm steps are performed, beginning at step 204. Otherwise, the damage protection algorithm steps, beginning at step 212, are carried out.

At step 204, a nominal current is subtracted from a largest sensed current to generate a normalized current value and the normalized current value is squared.

If any of the sensed current magnitudes of the sensing instance are greater than 4.4 times the nominal current magnitude 206, then the squared normalized current value is set 208 to a fast trip value. This substitution of a fast trip value for the squared normalized current value results in the trip curve moving to a fixed time constant regardless of sensed phase current. The results of the change are illustrated is FIG. 4 where once the sensed current reached a high enough value 312, the time delay to opening the circuit breaker is shortened from a relatively long time 308 to a shorter time 310 for the high sensed current portion 306 of the trip curve 302. It will be appreciated by those skilled in the art that the use of this fast trip value is particularly important when protecting the generator from problems related to the current being fed by the generator instantaneously spiking to high current levels which could damage the generator. Such situations are often difficult to detect with current sensors. In order to simplify the operation of the damage protection algorithm this step may be omitted such that the high current portion of the trip curve 302 would generally have the same contour as the low current portion 304 of the trip curve.

Otherwise, operation of the damage protection algorithm is continued a step 210 without a change to the squared normalized current value. In step 210, the squared normalized current value is added to a long term time count which is remembered between iterations of the damage protection algorithm. In addition, an over current warning is set on in step 210 on. This warning, like all of the warnings, may have a built-in delay before it is presented on a warning indicator panel to an operator of the gen-set.

If the long term time constant is greater than an $I^2$ trip constant 218, then operations continue at step 220. The $I^2$ trip constant corresponds to the predetermined number of consecutive iterations through the damage protection algorithm that an over current condition can exist before the circuit breakers are opened/tripped. Otherwise, if the long term time constant is less than or equal to the $I^2$ trip constant, controller 130 operations return to step 202 to begin another iteration of the damage protection algorithm.

Subsequently, if the largest sensed current magnitude is greater than 1.75 times the nominal current magnitude 222, then a fault flag is set to short circuit and a shutdown flag is set on 224. Otherwise, the fault flag is set to over current and the shutdown flag is set on 226.

At step 228, the breaker control signal 142 is set to instruct the circuit breaker 156 to open the electrical circuit. The operation thus ends 230 and is returned to step 202 to begin another iteration of the damage protection algorithm.

At step 212 a time constant is subtracted from the long term time count and an over current warning is set off. This reduction in the long term time count value gives the generator less time before the next circuit breaker trip if it has been tripped recently or been in an over current condition. This gives the generator extra time to cool off after it has be tripped.

At step 214, if the long term time constant is less than one, then the long term time constant is set to zero and the operations are returned to step 202 for the next iteration. Otherwise, operations are immediately returned to step 202 to begin another iteration of the damage protection algorithm.

An additional feature which the electrical generator system 100 may include is a mechanism in the controller 130 which sets the breaker control signal 142 to instruct the circuit breaker 156 to close the electrical circuit such that the controller 130 is reset after a circuit breaker trip/opening to return to iteratively performing the damage protection algorithm. Alternatively, if the circuit breaker is of a manual reset type, an operator must physically reset the circuit breaker and then restart the damage protection algorithm in the controller 130.

Figure 2:
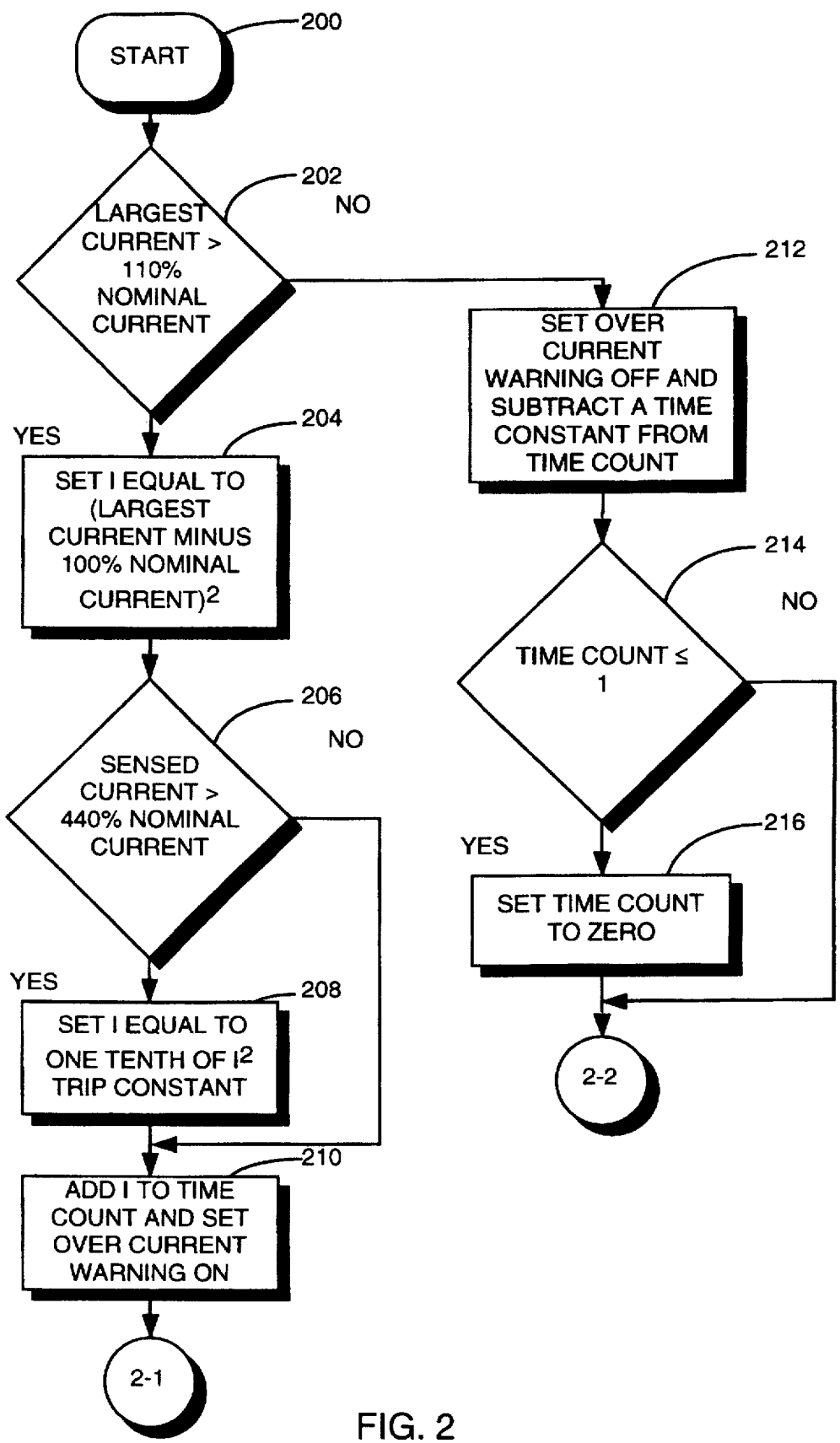
FIGS. 2 and 3 are flowcharts of the preferred embodiment electrical generator damage protection algorithm used in the system shown in FIG. 1 in accordance with the present invention.
Figure 3:
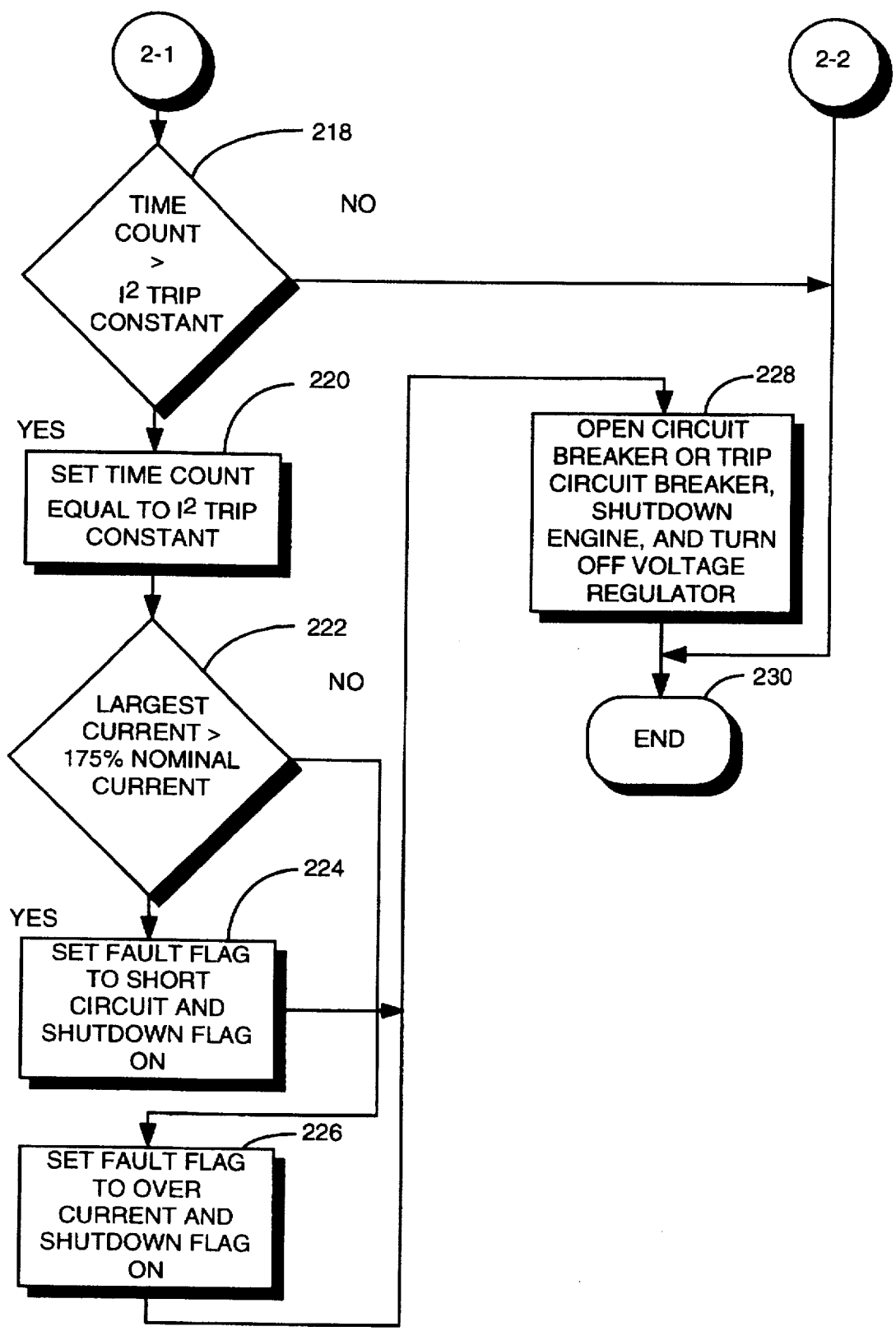

Although the controller 130 has been characterized by such terms as preceding, returning and moving, those skilled in the art will appreciate that these terms are used to describe the operation of controller 130 while processing the various programming steps illustrated by the various logic flow diagrams shown in FIGS. 2 and 3. In addition, a sample of some programming code which implements the overall generator damage protection algorithm is shown below in Table 1. This algorithm is tailored to a three phase generator have a coil voltage of 120 Volts.

TABLE 1

```
/*************** external variable declarations **************/
extern    WORD    pwmreg;
extern    WORD    largestcurrent;
extern    WORD    c1filtered;
extern    WORD    c2filtered;
extern    WORD    c3filtered;
extern    WORD    regnominal;
extern    WORD    curr_100_percent_a2d;
extern    WORD    curr_110_percent_a2d;
extern    WORD    curr_175_percent_a2d
extern    DWORD   i2trip_const;
extern    BYTE    flg_fault;
DWORD x;
/***************** external structure declarations **************/
extern    struct_fault_flgs shtd_flags [MAX_SHTD];
```

TABLE 1-continued

```
extern    struct_fault_flgs warn_flags [MAX_WARN];
/************************ function prototypes ********************/
void circi (void);
/************************ primary function ********************/
void circi(void)
{ /*** local label declarations ***/
    DWORD i;         /*local variable for i^2*t function*/
    /*static  DWORD    x;       local variable for i^2*t function*/
    if (largestcurrent > curr_110_percent_a2d)
    {
        i = largestcurrent - curr_100_percent_a2d;
        i *= 1;             /*calculate i ^ 2*/
        /* if(largestcurrent > curr_110_percent_a2d * 4) check if over
        4.4 times rated */
        if((c1filtered > 960) II (c2filtered > 960) II (c3filtered > 960))
        { i = i2trip_const / 10; /*set x for faster trip (10 * .0615)*/
        }
        x += i;
        warn_flags[OVERCURR].error = TRUE;       /*over current warning*/
        if(x > i2trip_const)
        { x = i2trip_const;     /*limit x to 35556 to prevent overflow*/
            if(largestcurrent > curr_175_percent_a2d)
            /*if current larger than 175% . . .*/
            {
                flg_fault = SHT_CKT;
                shtd_flags[SHT_CKT].error = TRUE;       /*short circuit*/
            }
            else
            {
                flg_fault = OVERCURR1;
                shtd_flags[OVERCURR1].error = TRUE;
                /*over current shutdown*/
            }
            if(SW_CB_CONTROL)    /*breaker control - open relay*/
            { CB_OPEN;
            }
            else                        /*trip mode - close relay*/
            { CB_TRIP;
            }
            SHUTDOWN_ENGINE;    /*macro: io.h*/
        }
    }
    else
    { warn_flags[OVERCURR].error = FALSE;     /*over current*/
        if(x > 0)
        { x = x - i2trip_const / 5854;
            /*integrate down in 360 sec 360/.0615 + 5854 */
            if((x <=1)
            { x = 0;
            }
        }
    }
}}/*EOF*/
```

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, pseudo-software code described above is provided for discussion purposes only. This underlying algorithm could be implemented in other pseudo-software code without departing from the scope and spirit of the present invention as claimed. In addition, the pseudo-software code could be implemented in any computer software language or set in firmware without departing from the spirit and scope of the invention as claimed. Further, the preferred embodiments were described in reference to a three phase power generator; however, it will be appreciated by those skilled in the art that a single phase or other polyphase gen-set may utilize a damage protection apparatus or algorithm like that described herein without departing from the scope and spirit of the present invention as claimed.

What is claimed is:

1. An electrical generator damage protection apparatus, comprising:

(a) a circuit breaker which opens and closes an electrical circuit in response to a breaker control signal; and (b) control means, operatively coupled to the circuit breaker, for generating the breaker control signal based upon a periodically sensed current magnitudes signal which is output by a generator, the control means controlling a square of total current output by the generator over a predetermined time span to be a value less than a value on a generator damage curve, the generator damage curve corresponding to a maximum amount of total current squared which can be generatable by the generator over the predetermined time span without damaging the generator.

2. The electrical generator damage protection apparatus of claim 1 wherein the control means comprises means for generating an engine shutdown signal based upon the periodically sensed current magnitudes signal which is output by a generator such that the engine shutdown signal stops an engine providing rotational energy to the generator prior to damage occurring in the generator as a result of generating more than the maximum amount of total current over the predetermined time span.

3. The electrical generator damage protection apparatus of claim 2 wherein the control means comprises means for generating an electric power regulation stop signal based upon the periodically sensed current magnitudes signal which is output by a generator such that the electric power regulation stop signal stops regulation of electrical power generated by the generator when the engine shutdown signal stops the engine.

4. The electrical generator damage protection apparatus of claim 1 wherein the control means comprises means for generating a generator excitation stop signal based upon the periodically sensed current magnitudes signal which is output by a generator such that the generator excitation stop signal stops the generator from generating current prior to damage occurring in the generator as a result of generating more than the maximum amount of total current over the predetermined time span.

5. The electrical generator damage protection apparatus of claim 1 wherein the control means comprises means for generating the breaker control signal based upon at least two different phase current magnitudes signals which are output by a generator and which are periodically sensed during each sensing instance.

6. The electrical generator damage protection apparatus of claim 1 wherein the control means comprises means for generating the breaker control signal by iteratively performing the following damage protection steps:

(a) determining if a largest sensed phase current magnitude of a sensing instance is greater than 1.1 times a nominal current magnitude, then performing steps (b) through (f), otherwise perform steps (g) through (h);

(b) subtracting a nominal current from a largest sensed current to generate a normalized current value;

(c) squaring the normalized current value;

(d) adding the squared normalized current value to a long term time count;

(e) determining if the long term time constant is greater than an $I^2$ trip constant, then performing step (f), otherwise returning to step (a) to begin another iteration of the damage protection steps;

(f) setting the breaker control signal to instruct the circuit breaker to open the electrical circuit and returning to step (a) to begin another iteration of the damage protection steps;

(g) subtracting a time constant from the long term time count; and (h) determining if the long term time constant is less than one, then setting the long term time constant to zero, otherwise returning to step (a) to begin another iteration of the damage protection steps.

7. The electrical generator damage protection apparatus of claim 6 wherein the control means damage protection steps further comprise the step of setting an over current warning on after the adding step (d).

8. The electrical generator damage protection apparatus of claim 6 wherein the control means damage protection steps further comprise the step of setting an over current warning off after the subtracting step (g).

9. The electrical generator damage protection apparatus of claim 6 wherein the control means damage protection steps further comprise the step of determining, prior to the adding step (d), if any of the sensed phase current magnitude of a sensing instance is greater than 4.4 times the nominal current magnitude, then setting the squared normalized current value to a fast trip value, otherwise continue to step (d).

10. The electrical generator damage protection apparatus of claim 6 wherein the control means damage protection setting step (f) further comprises determining if the largest sensed current magnitude is greater than 1.75 times the nominal current magnitude, then setting a fault flag to short circuit and a shutdown flag on, otherwise setting the fault flag to over current and the shutdown flag on.

11. The electrical generator damage protection apparatus of claim 6 wherein the control means damage protection setting step (f) further comprises setting an engine shutdown signal to instruct an engine providing rotational energy to the generator to stop prior to returning to step (a) to begin another iteration of the damage protection steps.

12. The electrical generator damage protection apparatus of claim 11 wherein the control means damage protection setting step (f) further comprises setting an electric power regulation stop signal to stop regulation of electrical power generated by the generator when the engine shutdown signal stops the engine prior to returning to step (a) to begin another iteration of the damage protection steps.

13. The electrical generator damage protection apparatus of claim 6 wherein the control means damage protection setting step (f) further comprises setting a generator excitation stop signal to instruct the generator to stop generating current prior to returning to step (a) to begin another iteration of the damage protection steps.

14. The electrical generator damage protection apparatus of claim 6 wherein the control means comprises means for setting the breaker control signal to instruct the circuit breaker to close the electrical circuit such that the control means is reset to subsequently continue iteratively performing the damage protection steps.

15. An electrical generator system, comprising:

(a) a generator to generate polyphase electrical power;

(b) a circuit breaker, operatively coupled to the generator, to open and close an electrical circuit for each electrical power phase in response to a breaker control signal, the electrical circuit having means for transmitting the electrical power to an external load;

(c) a current sensor, operatively coupled to the generator to periodically sense a magnitude of current for each electrical power phase during each sensing instance to generate a current magnitudes signal; and (d) control means, operatively coupled to the circuit breaker and the current sensor, to generate the breaker control signal based upon the current magnitudes signal, the control means controlling a square of total current generated by the generator over a predetermined time span to be a value less than a value on a generator damage curve, the generator damage curve corresponding to a maximum amount of total current squared generatable by the generator over the predetermined time span without damaging the generator.

16. The electrical generator system of claim 15 further comprising an engine mechanically linked to the generator which provides rotational energy to the generator and wherein the control means comprises for generating an engine shutdown signal based upon the periodically sensed current magnitudes signal which is output by the generator such that the engine shutdown signal stops the engine from providing rotational energy to the generator prior to damage occurring in the generator as a result of generating more than the maximum amount of total current over the predetermined time span.

17. The electrical generator system of claim 15 further comprising an electric power regulator operatively coupled to the generator for regulating the generated electrical power and wherein the control means comprises for generating an electric power regulation stop signal based upon the periodically sensed current magnitudes signal which is output by the generator such that the electric power regulation stop signal stops regulation of the generated electrical power when the engine shutdown signal stops the engine.

18. The electrical generator system of claim 17 wherein the electric power regulator comprises a voltage regulator.

19. The electrical generator system of claim 17 wherein the electric power regulator comprises a current regulator.

20. The electrical generator system of claim 15 further comprising an excitation winding operatively coupled to the generator for generating electrical current and wherein the control means comprises for generating a generator excitation stop signal based upon the periodically sensed current magnitudes signal which is output by the generator such that the generator excitation stop signal stops the generator from generating current prior to damage occurring in the generator as a result of generating more than the maximum amount of total current over the predetermined time span.

21. The electrical generator system of claim 15 wherein the control means comprises for generating the breaker control signal by iteratively performing the following damage protection steps:
(a) determining if a largest sensed phase current magnitude of a sensing instance is greater than 1.1 times a nominal current magnitude, then performing steps (b) through (f), otherwise perform steps (g) through (h);
(b) subtracting a nominal current from a largest sensed current to generate a normalized current value;
(c) squaring the normalized current value;
(d) adding the squared normalized current value to a long term time count;
(e) determining if the long term time constant is greater than an $I^2$ trip constant, then performing step (f), otherwise returning to step (a) to begin another iteration of the damage protection steps;
(f) setting the breaker control signal to instruct the circuit breaker to open the electrical circuit and returning to step (a) to begin another iteration of the damage protection steps;
(g) subtracting a time constant from the long term time count; and
(h) determining if the long term time constant is less than one, then setting the long term time constant to zero, otherwise returning to step (a) to begin another iteration of the damage protection steps.

22. The electrical generator system of claim 21 wherein the control means damage protection steps further comprise the step of setting an over current warning on after the adding step (d).

23. The electrical generator system of claim 21 wherein the control means damage protection steps further comprise the step of setting an over current warning off after the subtracting step (g).

24. The electrical generator system of claim 21 wherein the control means damage protection steps further comprise the step of determining, prior to the adding step (d), if any of the sensed current magnitudes of the sensing instance is greater than 4.4 times the nominal current magnitude, then setting the squared normalized current value to a fast trip value, otherwise continue to step (d).

25. The electrical generator system of claim 21 wherein the control means damage protection setting step (f) further comprises determining if the largest sensed current magnitude is greater than 1.75 times the nominal current magnitude, then setting a fault flag to short circuit and a shutdown flag on, otherwise setting the fault flag to over current and the shutdown flag on.

26. The electrical generator system of claim 16 wherein the control means comprises means for setting the breaker control signal to instruct the circuit breaker to close the electrical circuit such that the control means is reset to subsequently continue iteratively performing the damage protection steps.

27. A method for protecting an electrical generator from damage with a breaker control signal which controls total current output by a generator over a predetermined time span to a value which is less than that on a generator damage curve, the generator damage curve being a maximum amount of total current which can be generated by the generator over the predetermined time span without damaging the generator, the method comprising iteratively performing the steps of:
(a) periodically sensing a current magnitude of each phase of generated electrical power of the generator during each sensing instance;
(b) determining if a largest sensed phase current magnitude of a sensing instance is greater than 1.1 times a nominal current magnitude, then performing steps (c) through (g), otherwise perform steps (h) through (i);
(c) subtracting a nominal current from a largest sensed current to generate a normalized current value;
(d) squaring the normalized current value;
(e) adding the squared normalized current value to a long term time count;
(f) determining if the long term time constant is greater than an $I^2$ trip constant, then performing step (g), otherwise returning to step (a) to begin another iteration of the damage protection steps;
(g) setting the breaker control signal to instruct the circuit breaker to open the electrical circuit and returning to step (a) to begin another iteration of the damage protection steps;
(h) subtracting a time constant from the long term time count; and
(i) determining if the long term time constant is less than one, then setting the long term time constant to zero, otherwise returning to step (a) to begin another iteration of the damage protection steps.

28. The method of claim 27 further comprising the step of setting an over current warning on after the adding step (e).

29. The method of claim 27 further comprising the step of setting an over current warning off after the subtracting step (h).

30. The method of claim 27 further comprising the step of determining, prior to the adding step (e), if any of the sensed phase current magnitude of a sensing instance is greater than 4.4 times the nominal current magnitude, then setting the squared normalized current value to a fast trip value, otherwise continue to step (e).

31. The method of claim 27 wherein the setting step (g) further comprises determining if the largest sensed current magnitude is greater than 1.75 times the nominal current magnitude, then setting a fault flag to short circuit and a shutdown flag on, otherwise setting the fault flag to over current and the shutdown flag on.

32. The method of claim 27 wherein the setting step (g) further comprises setting an engine shutdown signal to instruct an engine providing rotational energy to the generator to stop prior to returning to step (a) to begin another iteration of the damage protection steps.

33. The method of claim 32 wherein the setting step (g) further comprises setting an electric power regulation stop signal to stop regulation of electrical power generated by the generator when the engine shutdown signal stops the engine prior to returning to step (a) to begin another iteration of the damage protection steps.

34. The method of claim 27 wherein the setting step (g) further comprises setting a generator excitation stop signal to instruct the generator to stop generating current prior to returning to step (a) to begin another iteration of the damage protection steps.

35. The method of claim 27 further comprising the step of setting the breaker control signal to instruct the circuit breaker to close the electrical circuit when a reset sequence is initiated prior to subsequently iteratively performing steps (a) through (i).

* * * * *